US012648551B2

(12) United States Patent
Romanova

(10) Patent No.: US 12,648,551 B2
(45) Date of Patent: Jun. 9, 2026

(54) INSECT TRAP

(71) Applicant: Anastasiia Romanova, Poltava (UA)

(72) Inventor: Anastasiia Romanova, Poltava (UA)

( * ) Notice: Subject to any disclaimer, the term of this patent is extended or adjusted under 35 U.S.C. 154(b) by 210 days.

(21) Appl. No.: 18/400,830

(22) Filed: Dec. 29, 2023

(65) Prior Publication Data

US 2024/0215562 A1 Jul. 4, 2024

(30) Foreign Application Priority Data

Dec. 30, 2022 (UA) .............................. a 2022 05132

(51) Int. Cl.
*A01M 1/02* (2006.01)
*A01M 1/10* (2006.01)

(52) U.S. Cl.
CPC ............ *A01M 1/023* (2013.01); *A01M 1/106* (2013.01)

(58) Field of Classification Search
CPC .............................. A01M 1/023; A01M 1/106
See application file for complete search history.

(56) References Cited

U.S. PATENT DOCUMENTS

| | | | | |
|---|---|---|---|---|
| 519,745 A | * | 5/1894 | Thomae ................. | A01N 59/00 43/122 |
| 5,020,270 A | * | 6/1991 | Lo ........................... | A01M 1/08 43/112 |
| 5,205,064 A | * | 4/1993 | Nolen ................... | A01M 1/023 43/112 |
| 5,255,468 A | * | 10/1993 | Cheshire, Jr. ........... | A01M 1/06 43/112 |
| 6,134,826 A | * | 10/2000 | Mah ...................... | A01M 1/223 43/99 |
| 6,688,035 B1 | * | 2/2004 | Shichman ............... | A01M 1/04 43/107 |
| 6,817,139 B1 | * | 11/2004 | Powell .................... | A01M 1/08 43/139 |
| 6,898,896 B1 | * | 5/2005 | McBride ................. | A01M 1/08 43/107 |
| 7,937,887 B2 | | 5/2011 | Child | |
| 9,049,855 B2 | | 6/2015 | Rocha | |

(Continued)

FOREIGN PATENT DOCUMENTS

| | | | | |
|---|---|---|---|---|
| CH | 666789 A5 | * | 8/1988 | ............. A01M 1/223 |
| CN | 105941368 A | * | 9/2016 | .............. A01M 1/06 |

(Continued)

*Primary Examiner* — Morgan T Jordan
(74) *Attorney, Agent, or Firm* — SALIWANCHIK, LLOYD & EISENSCHENK

(57) ABSTRACT

An insect trap has a housing with two chambers and a ventilation system, and an accumulation chamber connected to the housing. The ventilation system consists of an axial fan in a lower chamber, the fan is configured to effectively transfer air from an upper chamber to the accumulation chamber. The accumulation chamber is equipped with an escape inhibition means, and its structure ensures reliable retention of the insects. The housing is equipped with sources of infrared and ultraviolet radiation, which are arranged and adjusted so as to create the most attractive area for the insects. Thermal insulation and guidance of the air flow increase efficiency of attraction and suction of the insects. Therefore, the insect trap combines light and thermal emission and air capture in order to effectively attract and catch mosquitoes and other insects.

11 Claims, 5 Drawing Sheets

(56)     References Cited

U.S. PATENT DOCUMENTS

| | | | | |
|---|---|---|---|---|
| 10,585,192 | B2 * | 3/2020 | Weber-Grabau | G01V 8/20 |
| 12,167,725 | B2 * | 12/2024 | Romanova | A01M 1/026 |
| 2005/0060926 | A1 * | 3/2005 | Lee | A01M 1/08 |
| | | | | 43/139 |
| 2010/0186284 | A1 * | 7/2010 | Hyde | A01M 1/026 |
| | | | | 43/132.1 |
| 2011/0030266 | A1 * | 2/2011 | Roy | A01M 1/08 |
| | | | | 43/113 |
| 2011/0283597 | A1 * | 11/2011 | Coventry | A01M 1/08 |
| | | | | 43/107 |
| 2014/0137462 | A1 * | 5/2014 | Rocha | A01M 1/023 |
| | | | | 43/113 |
| 2014/0165452 | A1 * | 6/2014 | Rocha | A01M 1/08 |
| | | | | 43/139 |
| 2015/0216158 | A1 * | 8/2015 | Mizrach | A01M 1/026 |
| | | | | 43/107 |
| 2016/0245916 | A1 * | 8/2016 | Weber-Grabau | |
| | | | | H01J 37/32917 |
| 2017/0258068 | A1 * | 9/2017 | Eom | A01M 1/106 |
| 2017/0295772 | A1 * | 10/2017 | Studer | A01M 1/145 |
| 2018/0206472 | A1 * | 7/2018 | Maxik | A01M 1/06 |
| 2018/0206473 | A1 * | 7/2018 | Massaro | A01K 67/68 |
| 2018/0279598 | A1 * | 10/2018 | Hur | A01M 1/106 |
| 2019/0121302 | A1 * | 4/2019 | Reid | G05B 13/0275 |
| 2019/0133106 | A1 * | 5/2019 | Eom | A01M 1/08 |
| 2019/0159440 | A1 * | 5/2019 | Zheng | A01M 1/223 |
| 2019/0302265 | A1 * | 10/2019 | Jansson | A01M 31/002 |
| 2019/0350184 | A1 * | 11/2019 | Chang | A61L 9/20 |
| 2020/0000079 | A1 * | 1/2020 | Liu | A01M 1/04 |
| 2020/0229420 | A1 * | 7/2020 | Ben Hamozeg | G01G 19/42 |
| 2020/0245604 | A1 * | 8/2020 | CHerukumalli | A01M 1/106 |
| 2020/0367483 | A1 * | 11/2020 | Geier | A01M 1/14 |
| 2021/0153492 | A1 * | 5/2021 | Chang | A01M 1/04 |
| 2021/0153493 | A1 * | 5/2021 | Zhang | A01M 1/08 |
| 2021/0209352 | A1 * | 7/2021 | Fryshman | A01M 3/007 |
| 2021/0219535 | A1 * | 7/2021 | Romanova | A01M 1/023 |
| 2022/0104474 | A1 * | 4/2022 | Chellappan | A01M 1/106 |
| 2023/0210102 | A1 * | 7/2023 | Gan | A01M 1/08 |
| | | | | 43/113 |
| 2025/0057141 | A1 * | 2/2025 | Malave | A01M 1/06 |

FOREIGN PATENT DOCUMENTS

| | | | | |
|---|---|---|---|---|
| CN | 108887245 A | * | 11/2018 | A01M 1/08 |
| CN | 109287589 A | * | 2/2019 | G06V 10/267 |
| WO | WO-2014107753 A1 | * | 7/2014 | A01M 1/06 |

* cited by examiner

INSECT TRAP

CROSS-REFERENCE TO RELATED APPLICATION

This application claims priority to Ukrainian Application No. a 2022 05132, filed Dec. 30, 2022, which is hereby incorporated by reference in its entirety.

FIELD OF THE INVENTION

The invention relates to a portable insect catching device, in particular, to a trap having a structure that enables to provide a maximum number of functional possibilities for attracting and effective catching of blood-sucking flying insects, preferably, mosquitoes.

BACKGROUND

Use of tools for avoiding a contact between blood-sucking insects and a human is widely known from the prior art. Said tools are divided into two main categories, namely, repelling tools which facilitate to create unacceptable ambient conditions for the insects, preferably, using repellents, and tools for attracting followed by catching and killing being so-called traps which conversely create certain physical and/or chemical properties that attract the flying insects. First of all, the traps are used in places of mass stay of people being restaurants, hotels, outdoor cafes, bars, warehouses, offices etc., and they may be effective both outdoors and within rooms by attracting the insects out from the people towards themselves. One of the attraction factors of the traps is a use of a bright light, thereby effectively attracting the flying insects which will be killed after their collision with an electrical charge on a grid that is arranged opposite to a light source or they will be caught by a sticky surface that surrounds the light source. Other factors which are used in the traps include an imitation of properties of warm-blooded mammals, including a human, such as heat, odor, breath etc. Most of technical solutions in this field of the art utilize a combination of several baits by equipping the traps with elements for emitting light, heat, carbon dioxide, etc. The catching objective is achieved by creating sticky or mechanical or electro-discharge elements which are arranged along a way of approaching of the insect which is not sufficiently effective, since this way may be changed, so, in order to additionally guide the insects towards the catching tool, some technical solutions utilize suction fans.

Currently, traps are the most effective devices for catching the flying insects, and the traps utilize a combination of ultraviolet light and a thermal radiation, thereby attracting the insects, while the traps have a housing with a fan mounted therein for sucking an air and equipped with a special compartment that the insects get in without any possibility to fly out. Preferably, said devices are hand-held, and they may be powered both by a mains and accumulators, thereby making these traps much more advantageous as compared to other types.

The prior art teaches a wide range of insect trapping devices, and the applicant has selected several technical solutions among them, which are the closest to the proposed invention in terms of a set of essential features.

A U.S. Pat. No. 7,937,887 B2 dated May 10, 2011 teaches an insect trap and a method of attracting insects by means of a variable infrared radiation. According to this technical solution, the insect trap comprises an insect retention means provided within a housing of the trap in order to inhibit escape of insects, as well as a fan that guides an air flow through a porous bag, the trap further comprises insect attraction means that include at least one variable infrared radiation means arranged adjacent to the fan. The insect attraction means comprise at least one flickering or pulsing light source directed towards the fan. A drawback of the proposed technical solution is that an effective zone is very small and the insects are attracted at short distances only. The sucked insects get into the bag, but the bag loses its properties when the device is switched off, i.e., it is loosened and the insects flew away from the trap, since nothing inhibits them from doing so. The flickering or pulsing light source also affects the device efficiency, since a continuous radiation source imitates an alive warm-blooded living being that is more attractive for the insects. It does not concentrate attention and can be interrupted by a living carrier.

Also, a U.S. Pat. No. 9,049,855 B2 dated Jun. 9, 2015 teaches a similar solution, namely, an insect trap having an air-actuated damper. According to this technical solution, the insect trap comprises a housing composed of an upper chamber and a lower chamber that are interconnected, wherein an upper portion comprises a light source, a cover that is mounted on the housing, and a meshy accumulation chamber that is secured to a lower portion of the housing, a side wall of the upper chamber is made as a grate having transverse openings for providing a passage for air and insects, and an axial fan is mounted in the lower chamber of the housing, the axial fan is configured to draw the air from the upper chamber of the housing to the accumulation chamber, wherein the housing is equipped with insect escape prevention means, at least one supporting rod and a weighted rod.

A drawback of the proposed technical solution is that a radiation zone does not have any heat-insulating element that could inhibit a rapid cooling both by the fan and by external factors. The supporting rod and the weighted rod provide stability, but make the entire structure more complicated. The escape prevention means are not sufficiently effective, since the insects will flow away towards the fan after it is switched off.

It follows from this prior art that a need in such devices is rather high, but their structures bear a number of drawbacks which affect the operation efficiency.

SUMMARY OF THE INVENTION

Embodiments of the invention provide a portable insect trap that could resolve the prior art drawbacks and enable attraction and catching of insects, preferably, mosquitoes, by using effects of illumination, heating and suction simultaneously, while creating a zone of the greatest attraction for the insect in a location of the most probable catching, as well as enable their reliable retention within the trap without using any additional structural components.

Embodiments provide a trap having a housing that is equipped with insect attraction and escape prevention means, and that comprise two axially connected chambers. A side portion of an upper chamber is made as a grating chamber provided with openings for providing a passage for air and insects, while a lower chamber is provided with an axial fan mounted therein. The housing is closed by a cover on its top, while it is provided with a meshy accumulation chamber on its bottom, and the axial fan is configured to transfer the air from the upper chamber of the housing to the accumulation chamber. According to embodiments of the invention, a heat-insulating element is arranged between the fan and the wall of the lower chamber, and a lower portion of the upper chamber is provided with a conical narrowing towards the lower chamber of the housing and has an opening that is connected to an edge of a ventilation channel. Therewith, two electromagnetic radiation sources are used as the attraction means, while a first one is arranged on an outer side of the wall of the lower chamber of the housing and formed by a heating element that is arranged on an inner surface of the wall coaxially to the fan, and a second one is arranged in a central portion of the upper chamber of the housing and is a combined infrared and ultraviolet radiation source. A frequency of the infrared radiation of both sources is within a bioresonance wavelength range, while an intensity of the infrared radiation of the second source is greater than an intensity of the radiation of the first source. A rigid grid that is secured to the lower portion of the housing is used as the escape prevention means, the grid is shaped as a truncated cone directed towards the accumulation chamber.

Use of the two radiation sources enables to combine the light (ultraviolet) radiation and the thermal (infrared) radiation within those places that are the most optimal for the insect detection.

Owing to the infrared radiation within the bioresonance range that corresponds to a length of the infrared waves that are emitted by a human body and is from 7 to 10 μm, we have managed to create an object that attracts the insects from afar both visually and thermally, thereby forcing the insect to perceive the trap as a living object at various distances, which is as productive for luring as possible.

Therewith, specific features of locations of the radiation sources and a difference in the infrared radiation intensity allow to create a temperature path along the entire housing area, and the temperature path in the lower portion of the housing has the greatest area and forms an insect detection zone that is perceived from afar, and owing to the greater intensity of the infrared radiation in the upper portion of the housing, it helps to guide the insects directly to this zone being a zone of the greatest heat that is perceived by the insect as an available place of the most attractive body part of the living being (a vein or an artery) in the upper portion of the housing, in the fan suction zone directly.

Upon conduction of numerous studies, it has been found that the increase of the intensity of the infrared radiation in the upper portion of the housing changes a flight trajectory of the insect that was orienting, from afar, at the source arranged in the lower portion of the housing towards the upper portion. The insect flows offset towards the upper portion, where the fan creates catching air flows.

It is known that the insect vision for seeking a victim is provided by a gene IR21a and it is a kind of a thermal imager that provides the insects, in particular, mosquitoes, with an ability to distinguish a live organism from other objects.

The ultraviolet radiation that fades out, when the distance increases, much less as compared to the infrared radiation may be perceived by the insects at long distances and causes the insects to move towards it and to the zone where they may perceive the infrared radiation.

Studies have shown that the use of the two infrared radiation sources having different intensities leads to the change of the movement path of the majority of the insects at a short distance from a less intensive one towards a more intensive one. And in view of the fact that the more intensive source is arranged in the zone of air flows of the fan, they are caught by the air flows. That is, this particular combination of the radiation sources causes the significant increase of the device operation efficiency. The conical narrowing in the upper portion of the chamber and its connection to the edge of the ventilation channel provide an aerodynamic guide that increases the fan's catching zone for an incoming air flow, thereby enabling to catch the insects not only when they reached the inner portion of the upper chamber, but also on the approach to its grate.

The heat-insulating element that is provided between the fan and the wall of the lower chamber of the housing avoids cooling of the first radiation source and facilitates maintaining its constant temperature as well as the required level of the infrared radiation.

The cone shape of the insect escape prevention means effectively inhibits the insects from slippage down into the accumulation chamber, and its arrangement in the accumulation chamber at a distance that is not more than a width of the openings of the grate of the upper chamber of the housing inhibits their escape, since these dimensions, which are sufficient for the insect to pass through the grate on the fly and during suction into the accumulation chamber, cannot be used for flying out even if the fan is switched off.

According to an exemplary embodiment of the invention, a range of the ultraviolet radiation of the second source is from 360 to 365 nm, since such wavelength is safe for humans and animals, as well as it attracts the flying insects effectively at night.

Therewith, a heating mat or a film, or a tubular heater, may be used as the heating element for the first radiation source in order to provide a full and stable contact with the wall of the housing.

In order to retain the heat as long as possible and to avoid cooling of the second radiation source as a result of the fan operation, the heat-insulating element is provided between the heating element and the fan channel, and the heat-insulating element simply may be an air gap, but in a preferable exemplary embodiment, the structure utilizes a hollow cup that has the fan channel mounted therein and further enhances the heat-insulation of the wall of the housing.

The second radiation source may be made as a gas discharge lamp that represents both heat and light generator, or it may be made as a combination of the heating element and ultraviolet diodes arranged thereon.

The openings of the grate of the upper chamber of the housing may be shaped as horizontal or vertical slots that are formed by horizontal rings and vertical rods, and the rods may be used to arrange electrical connection elements between the portions of the housing.

According to one of exemplary embodiments, the accumulation chamber is made meshy at least in part, e.g., along a side surface only, while providing a total area of the grid openings of not less than a cross-sectional area of the ventilation channel, thereby providing the effective passage of the air flow and a traction of the fan even if the already caught insects are present in the accumulation chamber.

Also, according to possible exemplary embodiments of the trap, it may be equipped with an additional attraction means in a form of an attractant that emits human- or animal-like odor and that may be arranged, e.g., in the accumulation chamber in a form of a sachet, and, when the air flow exits through the meshy surface, it forms, around the trap, a smell trail that is attractive for the blood-suction insects. A breath imitation may be used as another one of the additional attraction means, which can be made by applying a titanium dioxide layer to an interior of the upper portion of the housing, and the titanium dioxide layer, when contacted with the heat from the second radiation source, releases a carbon dioxide that discharges outside during the fan operation.

According to one of exemplary embodiments, the housing of the trap has a dark coloring which, when combined with the brightness of the ultraviolet radiation, creates a contrast for providing an additional attraction. Therewith, the outer surface of at least the lower chamber of the housing is made matte, thereby enhancing the stability and uniformity of the infrared radiation from this surface.

In one of exemplary embodiments of the device, a remote control and data transmission means may be mounted. To this end, known devices and algorithms, e.g., a Wi-Fi or Bluetooth technology, may be used.

According to a further exemplary embodiment, the trap is equipped with an insect type recognition means arranged at an inlet and/or at an outlet of the ventilation channel. To this end, prior art means, including video- and/or photo fixation devices and devices for collecting a received information, may be used. These means may include one or more low-dimensioned video cameras connected to processors having software blocks that register an image of the insect that will be processed in the device directly using known processing algorithms and comparing the images to detect characteristic signs that enable identification of the insect type, or the image will be transferred for further processing and forming a corresponding statistical data indicating a geolocation. For example, this can be made by using cloud storages.

The video and/or photo fixation devices may be arranged both on the elements of the upper chamber structure to register the insects on the approach and in the lower chamber, e.g., at a point of connection between the escape prevention grid and the accumulation chamber, in order to register the caught insects. The chambers and the image processing software products are known from the prior art and widely used to recognize three-dimensional objects of various dimensions.

BRIEF DESCRIPTION OF THE DRAWINGS

A possibility of implementation of the invention is illustrated by the drawings, which depict the following.

MAIN DESIGNATIONS

Figure 1:
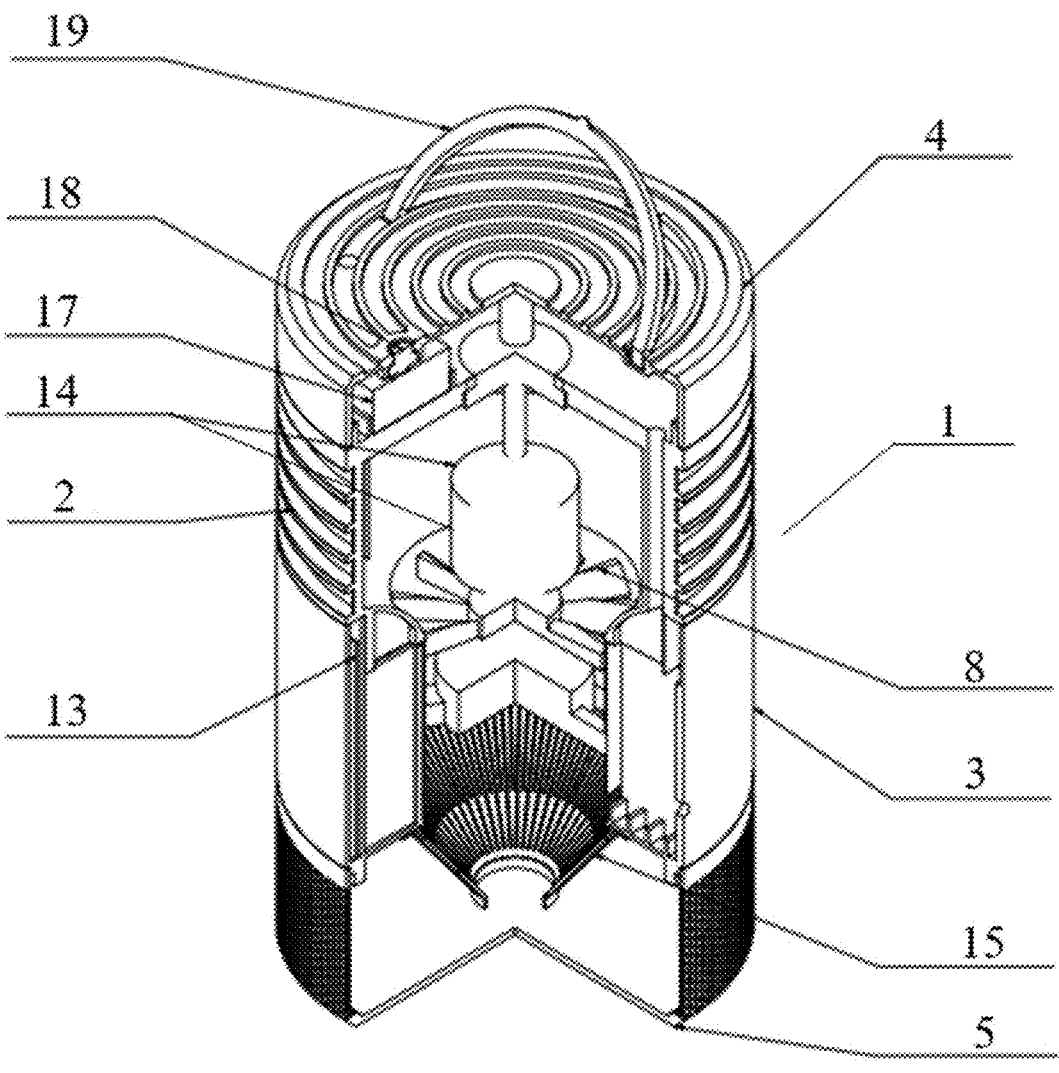
FIG. 1 illustrates a general isometric partial cross-sectional view of the trap.
Figure 2:
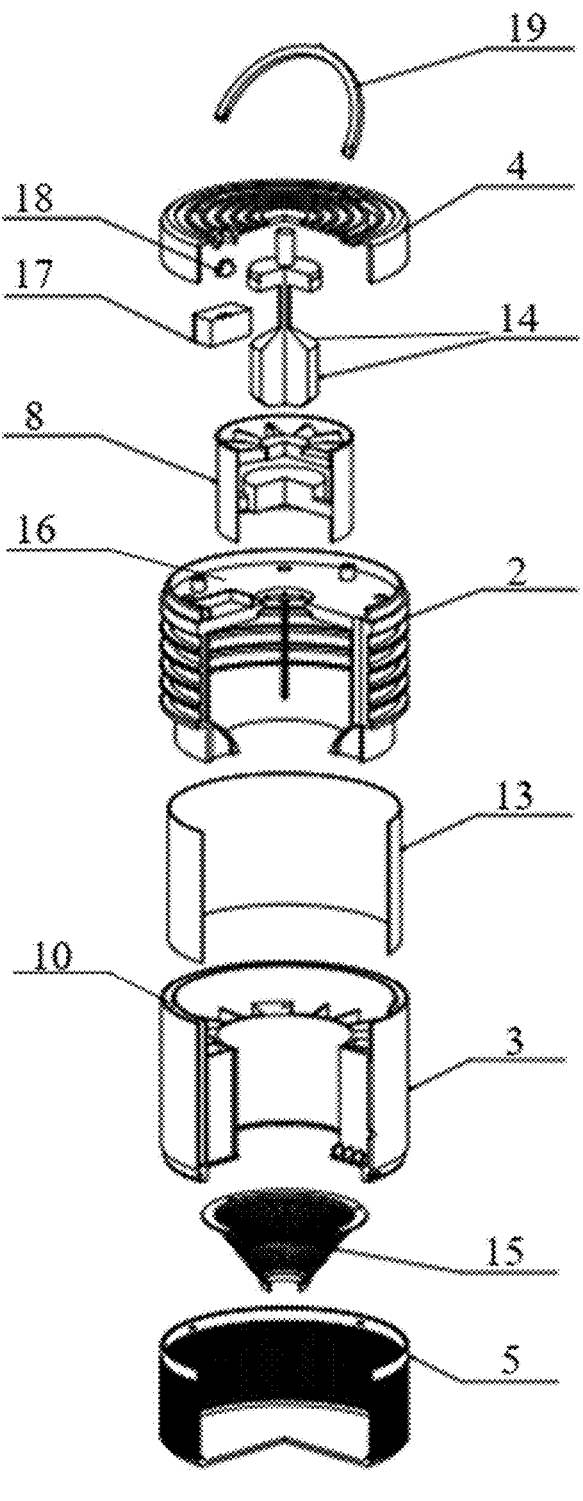
FIG. 2 illustrates an exploded view of the device.
Figure 3:
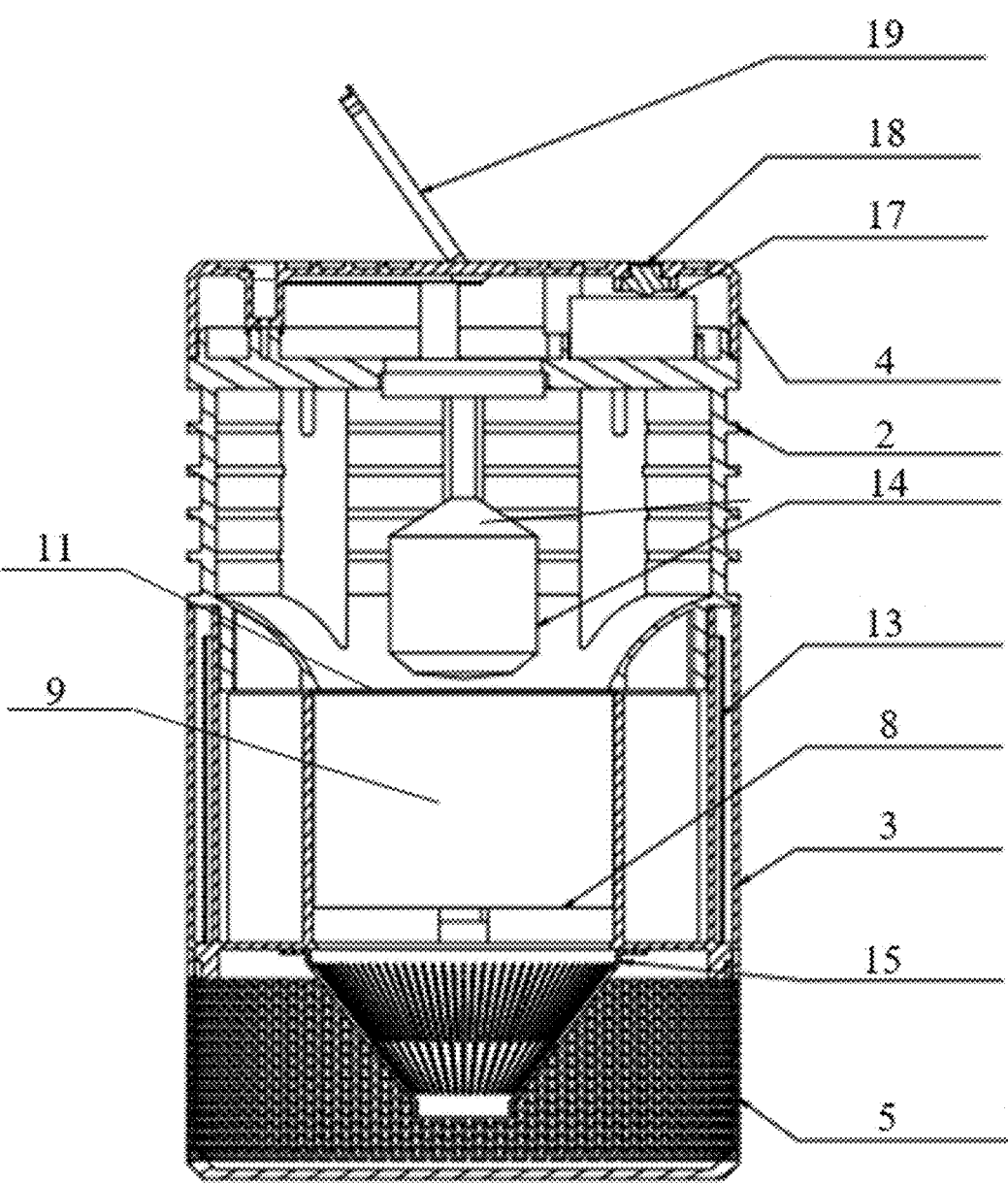
FIG. 3 illustrates a longitudinal cross-section of the device.
Figure 4:
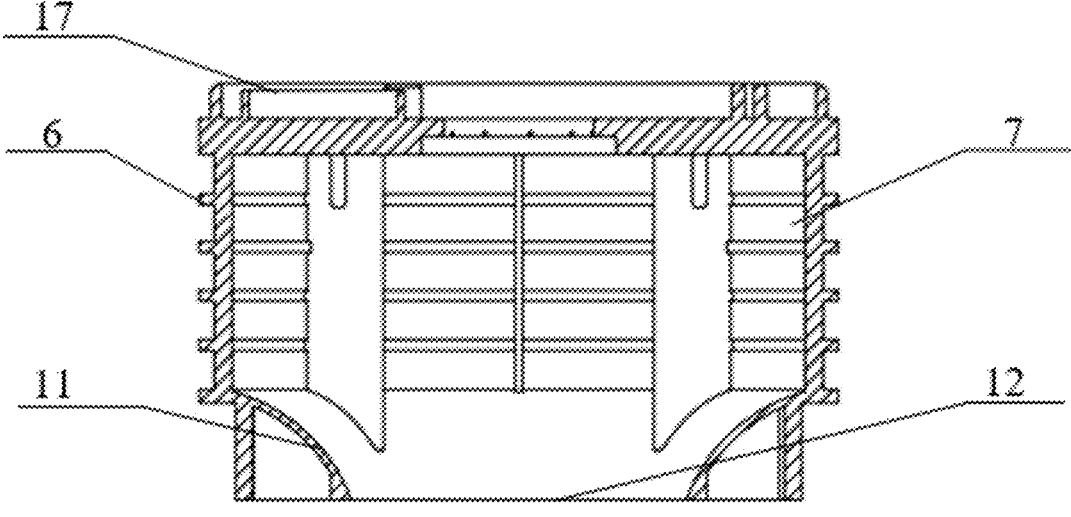
FIG. 4 illustrates a cross-sectional view of the upper chamber of the housing.

1—the housing;
2—the upper portion of the housing;
3—the lower portion of the housing;
4—the cover of the housing;
5—the meshy accumulation chamber;
6—the grate of the side wall of the upper chamber;
7—the openings of the grate of the side wall of the upper chamber;
8—the axial fan;
9—the ventilation channel;
10—the heat-insulating element;
11—the conical narrowing towards the lower chamber of the lower portion of the upper chamber;
12—the opening of the conical narrowing;
13—the electromagnetic radiation heating element;

14—the combined radiation source;
15—the insect escape prevention grid;
16—an end surface;
17—a wireless data transmission module;
18—a switch on/off button;
19—a handle.

DETAILED DESCRIPTION

In a preferred embodiment, the insect trap comprises the housing (1) that comprises the upper chamber (2) and the lower chamber (3). The cover (4) is mounted on the upper chamber, the cover may be equipped with the handle (19) to provide convenient trap carrying or hanging, and the meshy chamber (5) is secured to the lower chamber, the meshy chamber is a removable accumulation chamber for caught insects.

The axial fan (8) is mounted in the lower chamber (3) of the housing (1), and the axial fan is configured to move the air from the upper chamber (4) of the housing to the accumulation chamber (5). The upper chamber (2) is hollow and its side wall is made in a form of the grate (6) having slot-like openings (7) for providing a passage for air and insects. Therewith, the lower portion of the upper chamber (2) is provided with the conical narrowing (11) towards the lower chamber (3) of the housing (1) and has the opening (12) that is connected to the edge of the ventilation channel (9). During operation of the fan (8), the conical narrowing (11) provides the aerodynamic guide that increases the fan's (8) catching zone for the incoming air flow, thereby enabling to catch the insects not only when they reached the inner portion of the upper chamber (2), but also on the approach to its grate.

Figure 5:
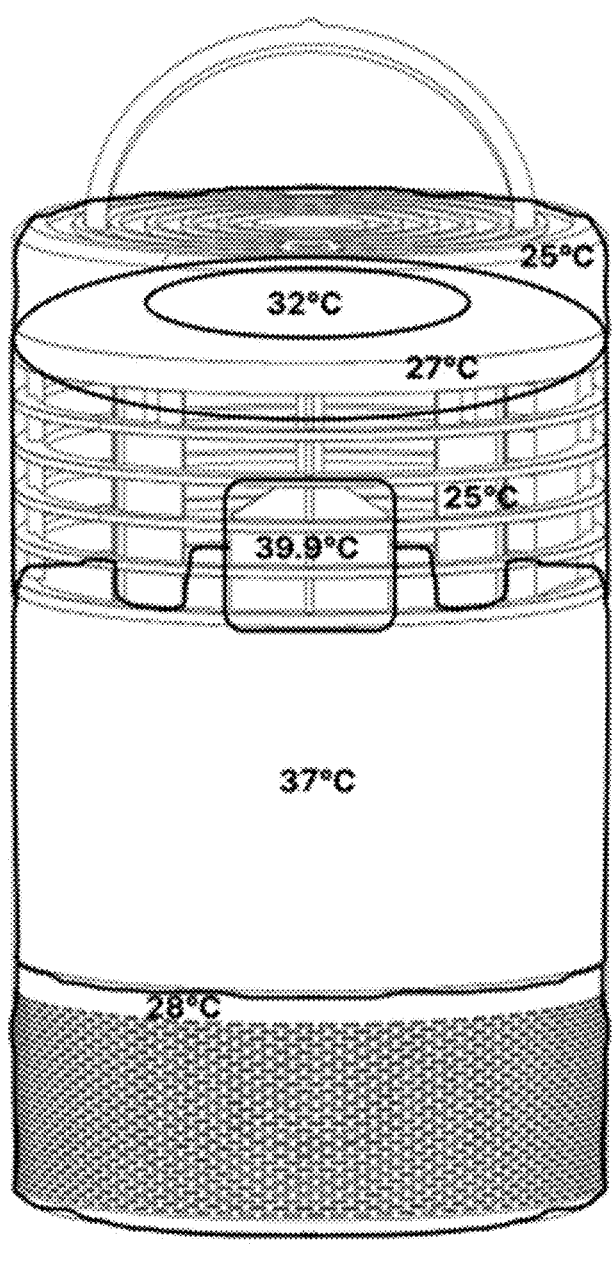
FIG. 5 illustrates the device in operation, while indicating a temperature difference.

In order to attract flying insects, the trap utilizes two main attraction means in a form of electromagnetic radiation sources. The first one is the infrared radiation source that is provided on the outer surface of the wall of the lower chamber (3) of the housing (1) by arranging on the inner surface of the wall of the heating element (13). Therewith, the heat-insulating element (10) is mounted between the fan (8) and the wall of the lower chamber (3), the heat-insulating element is formed as a hollow cup in the exemplary embodiment illustrated in the drawings, in order to stabilize the constant temperature of the chamber (3) surface and to avoid cooling as a result of the fan (8) operation. The second source is arranged in a center of the upper chamber (2) of the housing (1), and it is a combined infrared and ultraviolet radiation source (14). Therewith, the frequency of both radiation sources is within the bioresonance range of infrared waves, while the intensity of the infrared radiation of the second source (14) is greater than the intensity of the radiation of the first source (13). In order to provide such usage conditions, prior art heating and light technologies are used, and these technologies, when combined in the trap structure, allow to create, in the infrared radiation spectrum, an image that is similar to the one that is formed by insect sense organs during perception of a warm-blooded living being. FIG. 5 illustrates a temperature trail for perceiving the mosquitoes by the living being, a large temperature patch of 37° C. in a middle portion of the housing creates a maximum possible zone for detecting and visual contact, when approaching closer to the trap. After the mosquito approached, it seeks for the most vulnerable point to beat and selects the hottest one, i.e., a vein or an artery of the living being. In the present case, this is a gas discharge ultraviolet lamp that is heated up to a temperature of 39-40° C. and arranged in the upper portion of the trap, directly in the suction zone of the fan. The mosquito tends to reach the most vulnerable point, gets into a suction flow and gets into the trap. Owing to the accurate selection of the temperature patch, this embodiment has managed to increase the trap efficiency as high as possible as compared to other similar devices.

Therewith, the grid (15) is used as the escape inhibition means, and the grid is secured to the lower portion of the housing, a height of the grid is less than a height of the accumulation chamber (5) and the grid is shaped as the truncated cone directed towards the accumulation chamber (5). Therewith, a distance between the gird (15) and a bottom of the accumulation chamber (5) is not more than a width of the openings (7) of the grate (6), thereby making it impractical for the insects to fly out. After the insect got into the upper chamber (2), the fan (8) drags it into the accumulation chamber (5), while the grid (15) inhibits it from escaping from the chamber, and the insects will die in several hours by dehydration. The fan may have two usage modes, i.e., for using outdoors and within a room.

The trap is equipped with elements for interaction with power supply means, mains and accumulators, its electrical components and the switch-on device (18). The data wireless transmission module (17) may be provided between the cover (4) and the upper portion of the upper chamber (2), i.e., on its end surface (16), for providing a convenient and remote control of the device. The trap may be further equipped with the insect type recognition means (not illustrated in the drawings) arranged in the upper portion of the housing, thereby enabling to receive, process and transmit an information about the operation mode of the device and the type of the insects being attracted.

The housing may be made of any suitable materials, i.e., metal, plastic, wood, composite materials, etc., while the coloring should be dark, i.e., black, deep green, gray, blue, etc. The lower surface of the housing may be made matte by any known suitable method, i.e., by spraying, structuring, coating, etc. Preferably, the components of the housing are made cylindrical and equipped with a mutual fixation means, thereby providing a convenient servicing and an easy replacement of the components if needed. The trap may have provided in various dimensions that are suitable and sufficient to carry and to hang it. At the same time, many different modifications of both the housing shape and the fixation tools are possible, and they may be easily made by skilled persons without introducing any new matter.

Therefore, the claimed invention enables to create the insect trap, preferably, for mosquitoes, which provides the effective and reliable possibility of attraction, catching, and retention.

The invention claimed is:

1. A blood sucking insect trap comprising:
   a housing (1) comprising an upper chamber (2) and a lower chamber (3) that are interconnected;
   a cover (4) mounted on an upper end of the housing;
   a mesh accumulation chamber (5) secured to a lower portion of the housing;
   an axial fan (8) mounted in the lower chamber (3) of the housing (1); and
   a grid (15) secured to the lower portion of the housing, wherein a side wall of the upper chamber (2) is made in a form of a grate (6) having openings (7) for providing a passage for air and insects, wherein the axial fan is configured to transfer the air from the upper chamber (2) of the housing to the accumulation chamber (5), wherein a heat-insulating element (10) is configured as a hollow cup surrounding the axial fan, and is arranged between the fan (8) and a wall of the lower chamber (3), wherein a lower portion of the upper chamber (2) is provided with a conical narrowing (11) towards the lower chamber (3) of the housing (1) and has an opening (12) that is connected to an edge of a ventilation channel (9), wherein first and second electromagnetic radiation sources are provided in the housing, the first source (13) being an infrared radiation heat source arranged on an inner surface of the wall of the lower chamber (3) and releasing heat outward of the housing (1), and the second source arranged in a center of the upper chamber (2) of the housing (1) and being a combined infrared and ultraviolet radiation source (14), wherein a frequency of the both infrared radiation sources is within a bioresonance range of infrared waves, while an intensity of the infrared radiation of the second source (14) is greater than an intensity of the radiation of the first source (13), and wherein the grid (15) is used to inhibit the escape of insects trapped in the accumulation chamber (5), and a height of the grid is less than a height of the accumulation chamber (5), and the grid has a shape of a truncated cone directed towards the accumulation chamber (5).

2. The trap according to claim 1, wherein the ultraviolet radiation range of the second source (14) is from 360 to 365 nm.

3. The trap according to claim 1, wherein the heating element (13) is selected from a group that consists of a heating mat, an infrared film, and a tubular heater.

4. The trap according to claim 1, wherein the second radiation source (14) is a gas discharge lamp.

5. The trap according to claim 1, wherein the second radiation source (14) is configured as a combination of the heating element and ultraviolet light-emitting diodes.

6. The trap according to claim 1, wherein the openings (7) of the grate (6) are shaped as horizontal or vertical slots.

7. The trap according to claim 1, wherein at least a portion of the accumulation chamber (5) is mesh, and a total area of the openings of the grid is not less than a cross-sectional area of the ventilation channel.

8. The trap according to claim 1, wherein an attractant is arranged in the accumulation chamber (5).

9. The trap according to claim 1, wherein a titanium dioxide layer is applied in the upper portion of the housing.

10. The trap according to claim 1, wherein a wireless data transmission module (17) is arranged between the cover (4) and the upper portion of the upper chamber (2), on the upper end of the housing.

11. The trap according to claim 1, wherein the housing has a dark coloring, and the outer surface of at least the lower chamber of the housing is matte.

* * * * *